(12) United States Patent
Tanaka

(10) Patent No.: US 9,352,688 B2
(45) Date of Patent: May 31, 2016

(54) VEHICLE CAPABLE OF LOW NOISE RUNS

(71) Applicant: Masahide Tanaka, Osaka (JP)

(72) Inventor: Masahide Tanaka, Osaka (JP)

(73) Assignee: NL GIKEN INCORPORATED, Osaka (JP)

( * ) Notice: Subject to any disclaimer, the term of this patent is extended or adjusted under 35 U.S.C. 154(b) by 0 days.

(21) Appl. No.: 14/481,933

(22) Filed: Sep. 10, 2014

(65) Prior Publication Data

US 2014/0379192 A1    Dec. 25, 2014

Related U.S. Application Data

(63) Continuation of application No. 12/901,537, filed on Oct. 10, 2010, now abandoned.

(30) Foreign Application Priority Data

Oct. 18, 2009    (JP) .................................. 2009-239931

(51) Int. Cl.
*B60Q 5/00*    (2006.01)
*B60W 50/00*    (2006.01)

(52) U.S. Cl.
CPC ............... *B60Q 5/006* (2013.01); *B60Q 5/008* (2013.01); *B60W 50/0098* (2013.01); *B60W 2550/12* (2013.01); *B60W 2550/402* (2013.01)

(58) Field of Classification Search
CPC ............... B60W 2550/12; B60W 2550/402; B60W 50/0098; B60Q 5/006; B60Q 5/008
See application file for complete search history.

(56) References Cited

U.S. PATENT DOCUMENTS

| 2005/0175186 A1* | 8/2005 | Yasushi | B60Q 5/008 381/61 |
| 2005/0200462 A1* | 9/2005 | Maekawa | B60Q 5/008 340/435 |

* cited by examiner

Primary Examiner — Kim T Nguyen

(57) ABSTRACT

A vehicle comprises electric motor, generator of simulated engine sounds, decider of whether or not to generate simulated engine sounds and controller of the level of simulated engine sounds. The controller smoothly increases level of simulated engine sounds upon decision of sound generation on detection of pedestrian, crosswalk, narrow road, or road with no sidewalk. The decider is responsive to vehicle navigation system, or ETC, or camera of EDR. EDR records the decision as circumstantial evidence. The decision may be optionally possible, but is forcibly made upon necessity. Simulated engine sounds can be greater than, or equal to, or less than real engine sounds. The controller makes a soft peak of simulated engine sound upon brake or accelerator operated. Balance of simulated engine sounds among front, rear, right and left of vehicle is changeable in response to shift lever or blinker lever operation. The decision is visually indicated inside vehicle.

20 Claims, 7 Drawing Sheets

VEHICLE CAPABLE OF LOW NOISE RUNS

CROSS REFERENCE TO RELATED APPLICATION

This application is a Continuation Application of U.S. application Ser. No. 12/901,537 filed Oct. 10, 2010 herein incorporated by reference in its entirety.

BACKGROUND OF THE INVENTION

1. Field of the Invention

This invention relates to a vehicle capable of low noise runs

2. Description of the Related Art

In this field of the art, various attempts have been done with respect to a vehicle capable of low noise runs. Examples of vehicles capable of low noise runs include hybrid vehicles and electric vehicles which are favorable to quiet environment. On the other hand, the almost silent run of a hybrid or electric vehicle at lower speed means a problem for visually impaired pedestrians who rely more on audio inputs to know what is going around them have a problem. To solve the problem, it is proposed to mount speakers externally with a controller tied to the accelerator pedal. The system generates simulated engine sounds that will allow people in the vicinity hear the car approach.

On the other hand, Japanese Publication No. 2005-289175 proposes a fuel cell car capable of generates simulated engine sounds that will allow people in the vicinity hear the car approaching at lower speed. According to the proposal, simulated engine sounds are generated by an electronically controlled unit on the basis of a sensor for detecting revolution speed of a driving motor. The level of simulated engine sound is determined in accordance with revolution speed of air compressor less than a threshold when the speed of vehicle sensed by speedometer slowed down less than a threshold. The simulated engine sounds thus determined are emitted to the outside form a speaker to inform pedestrians of the car approach. Further, it is proposed to additionally prepare an environment signal generating means for the purpose of determining the level of simulated engine sounds in accordance with the speedometer or the environment signal generating means. The environment means the presence or absence of pedestrian, or daytime or evening or night time, area where vehicle runs, or the level of noise outside the vehicle.

However, there still exist in this field of art many demands for improvements of a vehicle capable of low noise runs vehicle system.

SUMMARY OF THE INVENTION

Preferred embodiments of this invention provide a vehicle capable of low noise runs in which warm and safe coexistence of both vehicles and pedestrians is possible.

Preferred embodiments of this invention provide a vehicle capable of low noise runs in which the original advantage of low noise runs is harmonized with the safety of pedestrians.

Preferred embodiments of this invention provide a vehicle capable of low noise runs with a possible misunderstanding between the driver inside and pedestrian outside of the vehicle avoided.

In a detailed design according to the above preferred embodiment, a vehicle capable of low noise runs is proposed, the vehicle comprising an electric motor for driving the vehicle, a sound generator arranged to generate simulated engine sounds outside the vehicle for pedestrians to hear the vehicle, a decider arranged to decide whether or not to have the sound generator generate the simulated engine sounds, and a controller arranged to change the level of the simulated engine sounds in accordance with a predetermined manner.

The decider above is advantageous to limit the generation of the simulated engine sounds to a case of necessity for a pedestrian and to keep the low noise runs in the other case. The controller above is advantageous in view of warm and safe coexistence of both vehicles and pedestrians.

In more detail, the controller is arranged to smoothly increase the level of the simulated engine sounds when the decider decides to have the sound generator start generating the simulated engine sounds. Thus, the controller is functioning not to astonish people in the vicinity of vehicle with sudden and artificial emergence of the simulated engine sounds in response to the decider.

According to further detailed design, the decider is arranged to have the sound generator generate the simulated engine sounds in response to a detection of a pedestrian in the vicinity of the vehicle, or in response to a detection that the vehicle is close to a crosswalk, or in response to detection that the vehicle is on narrow road, or in response to a detection that the vehicle is on a road with no sidewalk. These situations are considered to be a case of necessity for a pedestrian to be informed of the vehicle to approach or to start moving in the vicinity.

According to another detailed design, the vehicle further comprises a vehicle navigation system unit, wherein the decider is arranged to make the decision in response to the vehicle navigation system unit. The vehicle navigation system unit is possibly an advantageous source of information relating to crosswalk, narrow road, or a road with no sidewalk.

According to still another detailed design, the vehicle further comprises an electronic toll system unit, wherein the decider is arranged to make the decision in response to the electronic toll system unit. The electronic toll system unit is possibly an advantageous source of information for the decision by the decider since there is less possibility of pedestrian walking on the toll road and the meaningless and rather harmful generation of the simulated engine sounds upon traffic jam in toll way should be inhibited.

According to another detailed design, the vehicle further comprises a camera unit, wherein the decider is arranged to make the decision in response to the camera unit. The camera unit, which may be installed in the vehicle to capture outside image for an event data recorder for example, is possibly an advantageous source of information of pedestrian in the vicinity of the vehicle. In more detail, the captured image may give information of a pedestrian putting up an umbrella who may needs higher volume of the simulated engine sounds under high noise caused by rain drops on his or her umbrella.

According to still another detailed design, the vehicle further comprises an event data recorder unit arranged to record the decision by the decider. The record of the fact whether or not the simulated engine sounds was generated upon an accident or the like may constitute a circumstantial evidence. According to more detailed design, the vehicle further comprises manually setting unit, wherein the decider is arranged to make the decision in response to the manually setting unit. In this case, the feature of recording the decision into event data recorder unit may have a driver who sets the non-generation of the simulated engine sounds on his or her responsibility become more careful in driving the vehicle under such setting.

According to another detailed design, the vehicle further comprises a manually setting unit, wherein the decider is arranged to normally make the decision in response to the manually setting unit and to have the sound generator generate the simulated engine sounds under a predetermined condition regardless of the manually setting unit. In this detailed design, a driver can manually set the non-generation of the simulated engine sounds on his own decision to normally prefer silent travel while the simulated engine sounds can be automatically and forcibly generated upon necessity such as on an occasion of appearance of a pedestrian.

According to still another detailed design, the controller is arranged to make a peak of the level of the simulated engine sounds by softly increasing and then decreasing the simulated engine sounds. In this manner of control, pedestrians may naturally and more clearly notice the simulated engine sounds. In more detailed design, the vehicle further comprises an operating portion for operation of one of a brake and an accelerator, wherein the controller in arranged to make the peak in response to the operation at the operating portion. This detailed design is advantages for a driver to naturally and courteously notice the pedestrians of the existence of vehicle with the simulated engine sounds at a crawl in a narrow road filled by pedestrians.

According to another detailed design, the vehicle further comprises a gasoline engine for driving the vehicle, wherein the controller is arranged to set the level of the simulated engine sounds to one of a level greater than the real gasoline engine sounds, a level substantially equal to the real gasoline engine sounds and a level less than the real gasoline engine sounds. According to the design that the level of the simulated engine sounds is greater than the real gasoline engine sounds, pedestrians under foul weather or the like where high environmental noise is assumed can more easily hear the approach of the vehicle than in the case the real engine sounds generation. On the other hand, according to the design that the level of the simulated engine sounds is substantially equal to the real gasoline engine sounds, a seamless transition between the real engine sounds and the simulated engine sounds is possible. In this instance, a simulated engine sound preparation by means of sampling and recording the real engine sounds of own vehicle is advantageous. Further, according to the design that the level of the simulated engine sounds is less than the real gasoline engine sounds, a suitable simulated engine sounds generation is possible under such an environment that the real engine sounds are too much, but mere tire noise may be drowned out by the environmental noise.

In another detailed design according to the above preferred embodiment, a vehicle capable of low noise runs is proposed, the vehicle comprising an electric motor for driving the vehicle, a sound generator arranged to generate simulated engine sounds outside the vehicle for pedestrians to hear the vehicle including a plurality of generating portions, an operating portion for operation of the vehicle, and a controller arranged to change the balance among the levels of the simulated engine sounds from the plurality of generating portions in response to the operation at the operating portion. According to this feature, pedestrians especially involved in the in movement of the vehicle effectively hear the approach or presence of the vehicle. In more detail, the controller is arranged to change one of the balances of the simulated engine sounds between the front and the rear of the vehicle and between the right and the left of the vehicle. In the case of controlling balance of simulated engine sound level between the front and the rear of the vehicle, the front side level is increased upon forward travel of the vehicle while the rear side level is increased upon reverse travel, the control being in response to the operation of select lever, for example. On the other hand, in the case of controlling balance of simulated engine sound level between the right and the left of the vehicle, the right side level is increased upon right turn of the vehicle while the left side level is increased upon left turn, the control being in response to the operation of blinker lever, for example.

In another detailed design according to the above preferred embodiment, a vehicle capable of low noise runs is proposed, the vehicle comprising an electric motor for driving the vehicle, a sound generator arranged to generate simulated engine sounds outside the vehicle for pedestrians to hear the vehicle, a decider arranged to decide whether or not to have the sound generator generate the simulated engine sounds, and a visual indicator arranged to inform the driver inside the vehicle of the decision by the decider. The indication of the decision inside the vehicle where quietness is kept against outside noise is an effective help for the driver to become aware of the simulated engine sounds generation for avoiding such an inconsistency that the driver gets a false idea of no generation of the simulated engine sounds though the pedestrian actually hears the simulated engine sounds, or vice versa.

Other features, elements, arrangements, steps, characteristics and advantages according to this invention will be readily understood from the detailed description of the preferred embodiments in conjunction with the accompanying drawings.

The above description should not be deemed to limit the scope of this invention, which should be properly determined on the basis of the attached claims.

DETAILED DESCRIPTION OF THE PREFERRED EMBODIMENTS

Figure 1:
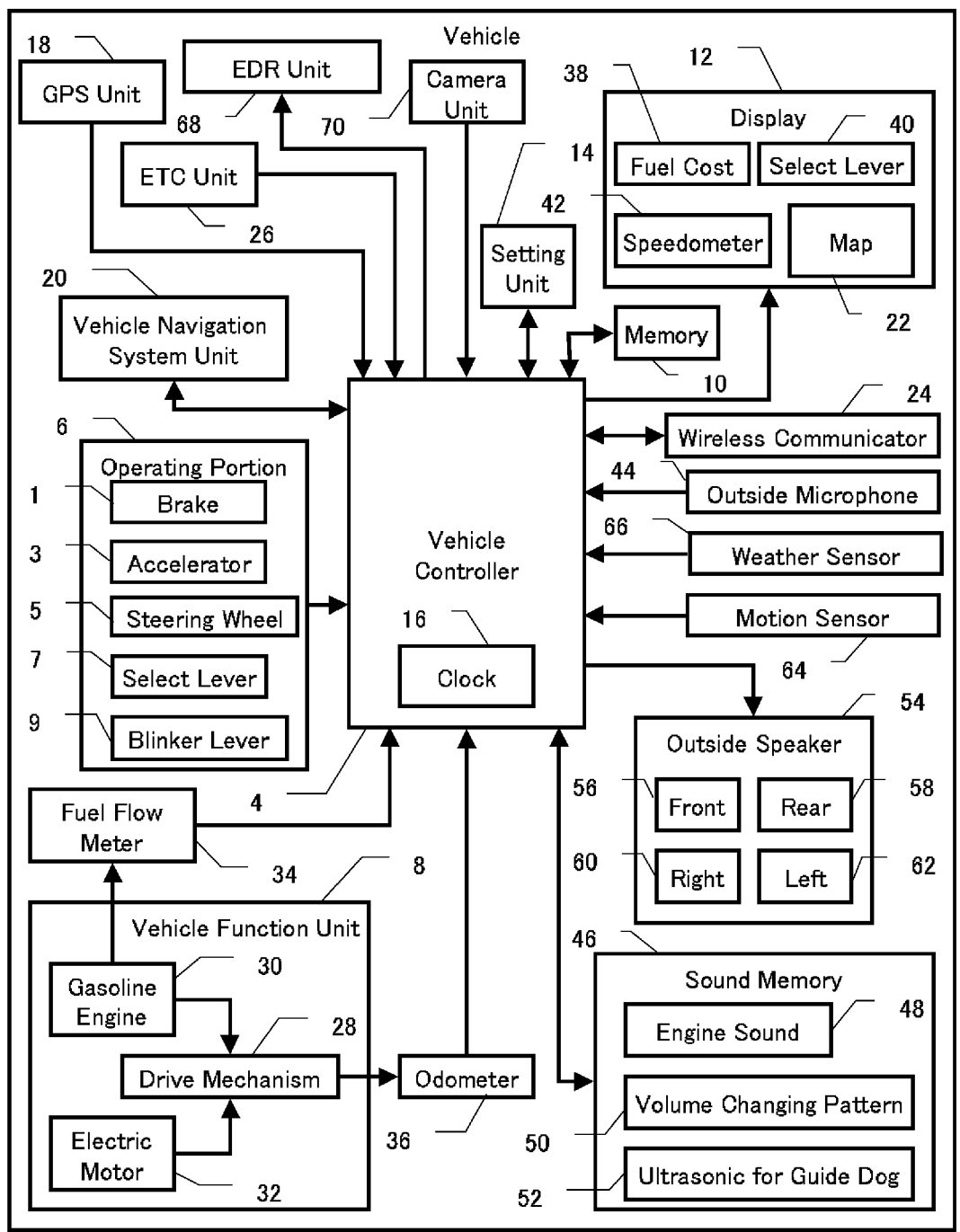
FIG. 1 is a block diagram showing a vehicle with a simulated engine sound generator according to an embodiment of this invention.

FIG. 1 is a block diagram showing a vehicle with a simulated engine sound generator according to an embodiment of this invention. Vehicle 2 is shown as a so-called hybrid car powered by both a gasoline engine and electric motor. Vehicle 2 includes vehicle controller 4 having computer for controlling vehicle function unit 8 in response to operating portion 6 including brake 1, accelerator 3, steering wheel 5, select lever 7 for the automatic transmission, which are to be operated by a driver. The functions of vehicle controller 4 are carried out in accordance with software stored in memory 10. Memory 10 further stores various temporary data necessary for controlling entire vehicle 2 as well as various information gotten inside or outside vehicle 2. Operating portion 6 further includes various supplementary members for operating additional functions, such as blinker lever 9 for operating blinkers.

Vehicle controller 4 further controls display 12 for graphic use interface (GUI) in cooperation with setting unit 14 and for indication of the result of control or calculation. Setting unit 14 includes a switch for selecting between the standard hybrid running mode and a forcible electric running mode. The forcible electric running mode is for solely using electric motor regardless of the running condition as in an electric car, in constant to the standard hybrid running mode in which the gasoline engine and electric motor are automatically interchanged depending on the running condition. Such the forcible electric running mode is advantageously set for realizing a silent running without fail in a late-night residential area. As will be mentioned later in detail, vehicle 2 is designed to generate simulated engine sound with vehicle driven by the electric motor in the standard hybrid running mode. According to a feature of this invention, the simulated engine sound is automatically inhibited with vehicle 2 set into the forcible electric running mode at bottom. In this regard, however, the inhibited simulated engine sound is forcibly restored even in the forcible electric running mode if vehicle 2 detects a person at a short distance or vehicle 2 approaches a crossing or the like where a person may exist in a relatively high provability.

Vehicle controller 4 includes clock 16, the clock time of which is utilized in various functions. For example, according to a feature of this invention, the volume of the simulated engine sounds is automatically increased in daytime so that pedestrians may easily hear the approach of vehicle 2 under presumed high environmental noise. On the other hand, the volume of the simulated engine sounds is automatically decreased in late-night time to a level less than that of a real engine noise so as to avoid unnecessary sound generation which may otherwise harm the presumed silent environment. The clock time of clock 16 utilize in the above sound volume control or the like is often and automatically set right by means of ratio wave time information outside.

Global positioning system (GPS) unit 18 receives the absolute position information of vehicle 2 including latitude, longitude and altitude from the satellite and the nearest broadcast station according to GPS, which information being sent to vehicle controller 4. Vehicle navigation system unit 20 processes the absolute position information coming from GPS unit 18 by way of vehicle controller 4 to indicate the position of vehicle 2 on map 22 in display 12. The information from vehicle navigation system 20 is utilized to automatically control the generation of the simulated engine sounds in such a manner that the simulated engine sounds are automatically generated in a residential roads area or the like where pedestrians may exist in a high probability, while the simulated engine sounds are automatically muted on highway or the like where pedestrians may not exist in a high probability. Especially, on a road without sidewalk or a narrow road without center divider, the simulated engine sounds are automatically generated in the highest priority. The types of areas with or without the simulated engine sounds generation are distinguishable from each other by different colors in map 22, which informs the driver of whether vehicle 2 is currently running with or without the simulated engine sounds generated.

Vehicle 2 is also provided with short-range wireless communicator 24 capable of communicating with wireless communications installed in various equipment or machine on a road, such as traffic light or a sign for crosswalk, located at places where pedestrians may cross the road. Thus, vehicle 2 can automatically begin generating the simulated engine sounds when wireless communicator 24 comes to receive signal form one of the traffic lights or signs by means of approaching it, and also automatically stop generating the unnecessary simulated engine sounds when wireless communicator 24 can no more receive signal form the traffic light or the sign by means of leaving it. In place of or in addition to short-range wireless communicator 24, the information from vehicle navigation system 20 is further utilizable to automatically control the above mentioned generation of the simulated engine sounds at places where pedestrians may cross the road since the information from vehicle navigation system 20 includes the locations of the traffic lights or crosswalks.

Electronic toll system (ETC) unit 26 receives at toll gate or the like the information of the motorway toll for storage in memory 10 by way of vehicle controller 4. The location information from vehicle navigation system unit 20, or the information of possible existence of pedestrians from short-range wireless communicator 24, or the information of going into or out of a toll highway form ETC unit 26, or one of various combinations thereof is utilizable to automatically control the generation of the simulated engine sounds in accordance with the area in which vehicle 2 is running. For example, the simulated engine sounds are automatically generated on a residential road or local road outside a toll highway where pedestrians may exist in a high probability, while the simulated engine sounds are automatically muted in an area where pedestrians may not exist in a high probability.

Vehicle function unit 8 includes gasoline engine 30 and electric motor 32 for generating power to be transmitted to drive mechanism 28 having transmission and wheels. Fuel flow meter 34 measures fuel flow injected into gasoline engine 30 through injection valve to inform vehicle controller 4 of the measured fuel flow. Odometer 36 calculates the run of vehicle 2 by multiplying the known diameter of the wheel in drive mechanism 28 by the number of rotations thereof to inform vehicle controller 4 of the calculated run. Thus, vehicle controller 4 calculates the flash fuel cost on the basis of the fuel flow and the run to indicate it at flash fuel cost area 38 in display 12. Vehicle controller 4 further calculate average fuel cost on the basis of the flash fuel cost to indicate the results in display 12 at fuel cost area 38.

Display 12 further includes speedometer area 42 for indicating the speed of vehicle 2 in accordance with the information from drive mechanism 28 by way of vehicle controller 4. The color for indicating the speed in speedometer area 42 is designed to differ between conditions with and without generation of the simulated engine sounds to inform the driver of whether or not the simulated engine sounds are actually generated. Thus, the driver is capable of sharing the fact of the simulated engine sounds generation with the pedestrians outside since the simulated engine sounds is hardly audible within vehicle 2. Display 12 also includes select lever indicator are 40 for indicating one of select lever positions, "P", "R", "N", "D", and "L".

The followings are explanation for the details of how to generate the simulated engine sounds. Outside microphone 44 is to pick up sounds outside vehicle 2 for dual purposes. The first purpose or function of outside microphone 44 is to sample own engine sounds of vehicle 2 by mean of practicing dummy runs with gasoline engine 30 under various running conditions prior to the shipping, the sampled engine sounds being transmitted to vehicle controller 4 for recordation. Thus, the simulated engine sounds in this case are created based on own real engine of vehicle 2. This realizes a seamless transition between the real engine sounds and the simulated engine sounds since the origin of sounds are both the same. In taking the simulated engine sounds, the starting-up and low speed running in the dummy runs are forcibly carried out by gasoline engine 30 even in the standard hybrid running mode setting in which the starting-up and low speed running are normally carried out by electric motor 32.

Vehicle controller 4 controls sound memory 46 to record the engine sounds picked up by outside microphone 24 in relationship to the information of operating condition of accelerator 3 and the fuel flow detected by fuel flow meter 34 at the time of sampling the engine sounds. Accordingly, sound memory 46 records a correlation table of engine sound data 48 and its volume changing pattern data 50 in relation to the information of operating condition of accelerator 3 and the fuel flow detected by fuel flow meter 34 for various running conditions. Sound memory 46 further stores ultrasonic sound data 52 for guide dog. The ultra sonic sound is to be generated in the motor running condition in place of the simulated engine sounds to inform a guide dog of the approach of vehicle 2 in the late-night residential area, where engine noise is harmful.

The second purpose or function of outside microphone 44 is to pick up environmental noise during actual run by electric motor 32 to automatically control the volume of the simulated engine sounds in accordance with the environmental noise. The automatic control of the volume is carried out in such a manner that the volume of the simulated engine sounds is increased to a level greater that that of real engine sounds in the case of environmental noise over a first limit so that pedestrians may easily hear the approach of vehicle 2. On the other hand, the volume of the simulated engine sounds is decreased to a level less that that of real engine sound in the case of environmental noise less than a second limit so as to avoid unnecessary sound generation which may otherwise harm the silent environment.

Outside speaker 54 includes front speaker unit 56 for forward travel and rear speaker unit 58 for reverse travel, the volume balance of simulated engine sounds being so controlled that the volume of one of front speaker unit 56 and rear speaker unit 58 is greater than that of the other in accordance with the traveling direction of vehicle 2 controlled by the operation of select lever 7. Outside speaker 54 further includes right speaker unit 60 and left speaker unit 62, the volume balance of simulated engine sounds being so controlled that the volume of one of right speaker unit 60 and left speaker unit 62 is greater than that of the other in response to the operation of blinker lever 9 indicating the turning direction of vehicle 2. Thus, pedestrians to be approached by vehicle 2 may easily hear the simulated engine sounds, while pedestrians to be left by vehicle 2 may not be suffered from unnecessary simulated engine sounds.

Motion sensor 64 is for detecting the existence of pedestrians by their motions to automatically generate the simulated engine sounds so that the pedestrians may notice the approach of vehicle 2. On the other hand, unnecessary simulated engine sounds are not generated if motion sensor 64 does not detect any pedestrian around vehicle 2. Upon generation of the simulated engine sounds in response to motion sensor 64, the volume of the simulated engine sounds is softly increased from zero level not to astonish the pedestrians with simulated engine sounds otherwise generated suddenly in the vicinity. Weather sensor 66 is for detecting rain drops on vehicle 2 or low barometric pressure to automatically increase the volume of the simulated engine sounds to a level greater than that of the real engine sounds under foul weather so that pedestrians possibly putting up their umbrellas may easily hear the approach of vehicle 2 under presumed high environmental noise caused by rain or wind. On the other hand, the volume of the simulated engine sounds is automatically decreased in fine weather so as to avoid unnecessary loud simulated engine sounds generated.

Event data recorder unit (EDR) 68 is for recording various events relating to the travel of vehicle 2 including front and rear road images captured by camera unit 70. EDR unit 68 is arranged to further record the operations at operating portion 6 and the settings at setting unit 14 by the driver on its responsibility. Accordingly, such a condition is to be recorded on EDR 68 that vehicle 2 is running in the forcible electric running mode in which the simulated engine sound is automatically inhibited. Such a record may constitute a circumstantial evidence if an accident will unfortunately occur due to an injured person unable to notice a silent approach of vehicle 2. Thus, a driver who sets the forcible electric running mode becomes more careful in driving under such setting.

The image captured by camera unit 70 is processed to detect an existence of a pedestrian putting up umbrella to automatically increase the volume of the simulated engine sounds to a relatively high level so that the pedestrian may easily hear the approach of vehicle 2 under high noise caused by rain drops on his or her umbrella. On the other hand, the volume of the simulated engine sounds is not so increased if no pedestrian putting up umbrella is detected through processing the image from camera unit 70. This automatic volume control in response to the detection of a pedestrian actually putting up umbrella can be combined with the automatic volume control in response to weather sensor 66 explained above.

For the purpose of polite notice in shopping area or the like in which narrow roads are crowded with pedestrians, vehicle 2 is arranged to generate the simulated engine sounds with its volume changed in accordance with natural and soft wave pattern in response to frequent repetitions between operations of brake 1 and accelerator 3, which are ordinarily and naturally experienced when going at a crawl. The above waveform pattern of changing the volume of the simulated engine sounds is a copy of the change in volume of real engine sounds upon crawl which are the natural result of the above mentioned frequent repetitions between brake and accelerator operations. Thus, warm coexistence of both vehicles and pedestrians in shopping area or the like is realized with unpleasant horn or factitious electric melody notice avoided.

Figure 2:
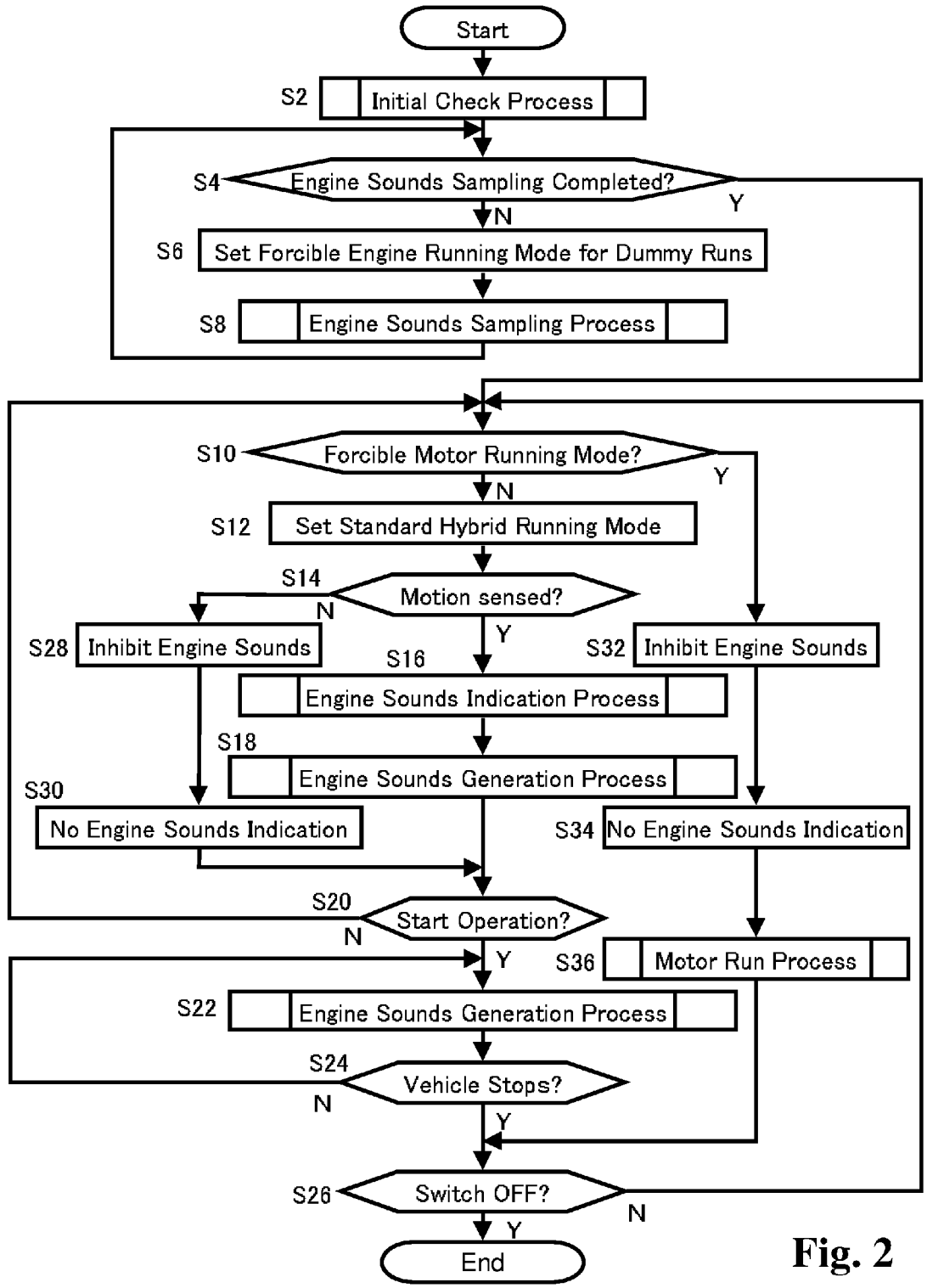
FIG. 2 is a flowchart showing the function carried out by vehicle controller of the embodiment in FIG. 1.

FIG. 2 is a flowchart showing the function carried out by vehicle controller 4 of the embodiment in FIG. 1. Vehicle controller 4 is basically a computer, the flowchart in FIG. 2 showing the function of the computer. The flowchart starts when vehicle 2 becomes into a condition for ready to run. The condition for ready to run includes the actually running condition. In detail, the flow starts with the electric switch for ready to run turned from the off position to the on position. If the flow starts, a process for initial check of vehicle function unit 8 is carried out. The initial check process in step S2 includes a visual indication and audio announce of the result of the check.

Next in step S4, it is checked whether or not the sampling of real engine sounds are completed to get the simulated engine sounds. If not, the flow goes to step S6 to automatically set vehicle 2 into the forcible engine running mode for dummy runs, in which sole gasoline engine 30 is made active with electric motor not used during idling as well as all running condition including low speed running. Thus, real engine sounds are to be generated in dummy runs for sampling. Then, the flow advances to engine sounds sampling process in step S8, in which various running conditions beginning with the starting of the gasoline engine 30 are directed in accordance with a predetermined program stored in memory 10 to successively cause various engine sounds corresponding to each running condition and transitions between the running conditions. The engine sounds thus generated are successively sampled and stored in sound memory 46 as engine sound data 48 for various running conditions and volume changing pattern data 50 into a correlation table in relation with the information of operating condition of accelerator 3 and the fuel flow detected by fuel flow meter 34. Upon completion of step S8, the flow goes back to step S4 to check again whether or not the sampling of real engine sounds are completed. The loop of steps S2 to S8 is repeated as long as engine sounds sampling is incomplete, during which the standard hybrid running is inhibited.

On the other hand, if it is determined in step S4 that the sampling of real engine sounds had just been completed or vehicle 2 is in the standard hybrid running mode with the sampling of real engine sounds completed, the flow advances to step S10. Since the engine sounds sampling process in step S8 has normally been completed prior to the shipping, the flow in FIG. 2 goes form step S4 directly to step S10 if the flow is stated by an ordinary owner of vehicle 2 with the electric switch for ready to run turned from the off position to the on position.

In step S10 it is checked whether or not the forcible motor running mode is set. If not, the flow goes to step S12 to automatically set the standard hybrid running mode. The flow then goes to step S14 to check whether or not motion sensor 64 detects any pedestrian exists in the vicinity of vehicle 2. If any, the flow advances to step S16 to carry out engine sounds indication process, in which the fact of generating the simulated engine sounds is indicated within vehicle 2 so that the driver inside vehicle 2 may know the generation of the simulated engine sounds outside, the details of the engine sound indication process being explained later. Next in step S18, engine sounds generation process is carried out to go to step S20, the details of the engine sound indication process in step S18 being also explained later. Thus, even in a condition that vehicle 2 is stopped, the simulated engine sounds of starting up or idling are generated as in the case of gasoline engine vehicle if motion sensor 64 detects a pedestrian in the vicinity of vehicle 2.

In step S20, it is checked whether or not a start operation to run. If the start operation is detected in step S20, the flow going to the engine sounds generation process during run in step S22, the details of the engine sound indication process being explained later. If the engine sounds generation process during run in step S22 has been completed, the flow goes to step S24 to check whether or not vehicle 2 stops in response to the operation by brake 1. If not, the flow goes back to step S22 to repeat steps S22 and S24 unless vehicle 2 stops, the simulated engine sounds generation continuing during the repetition.

On the other hand, if it is detected in step S24 that vehicle 2 stops in response to the operation by brake 1, the flow goes to step S26 to check whether or not the electric switch for ready to run is turned from the on position to the off position. If the switch off is detected in step S26, the flow goes to the end. By the way, if it is determined in step S14 that motion sensor 64 detects no pedestrian exists in the vicinity of vehicle 2, the flow goes to step S28 to inhibit generation of the simulated engine sounds. Further in step S30, the driver is informed by an indication within vehicle 2 of the fact that no simulated engine sound is generated outside vehicle 2, the flow then going to step S20. Thus, the simulated engine sounds are not generated with no pedestrian existing in the vicinity of vehicle 2 even when the electric switch for ready to run is turned from the off position to the on position, which takes over such an advantage of conventional hybrid vehicles that no engine sound arises during idling or low speed running to keep environmental silence.

If it is detected in step S10 that the forcible motor running mode is set, the flow goes step S32 to inhibit generation of the simulated engine sounds. Further in step S34, the driver is informed by an indication within vehicle 2 of the fact that no simulated engine sound is generated outside vehicle 2, the flow then going to step S36. In step S36, motor run process is forcibly carried out to realize motor run from start up till stopping of vehicle 2, the details of which will be explained later. If the motor run process in step S36 has been completed, the flow goes to step S26. Thus, the simulated engine sounds are not generated in principle with the forcible motor running mode set except for a case of necessity for keeping safety.

If no start operation is detected in step S20, the flow goes back to step S10 to deal with a possible change in operation to set the forcible motor running mode in idling state. The loop of steps S10 to S20 and steps S28 and S30 is repeated as long as the forcible motor running mode is not set. Thus, it is automatically decided to or not to generate the simulated engine sounds in response to the change in detection of pedestrians by motion sensor 64 in step S14 during the repetition of the loop. In other words, if the sensed pedestrian comes off vehicle 2 with the simulated engine sounds generated, the generation is automatically stopped to get back to silence. On the other hand, if a pedestrian approaches vehicle 2 with no simulated engine sound generated, the simulated engine sounds are automatically start to be generated. In this case, the volume of the simulated engine sounds is softly and naturally increased from zero level not to astonish the sensed pedestrian, the volume control in this manner being explained later in more detail. By the way, if it is not detected in step S26 that the electric switch for ready to run is turned from the on position to the off position, the flow returns to step S10 to repeat the loop of steps S10 to S36 for dealing with various changes in situation or setting.

Figure 3:
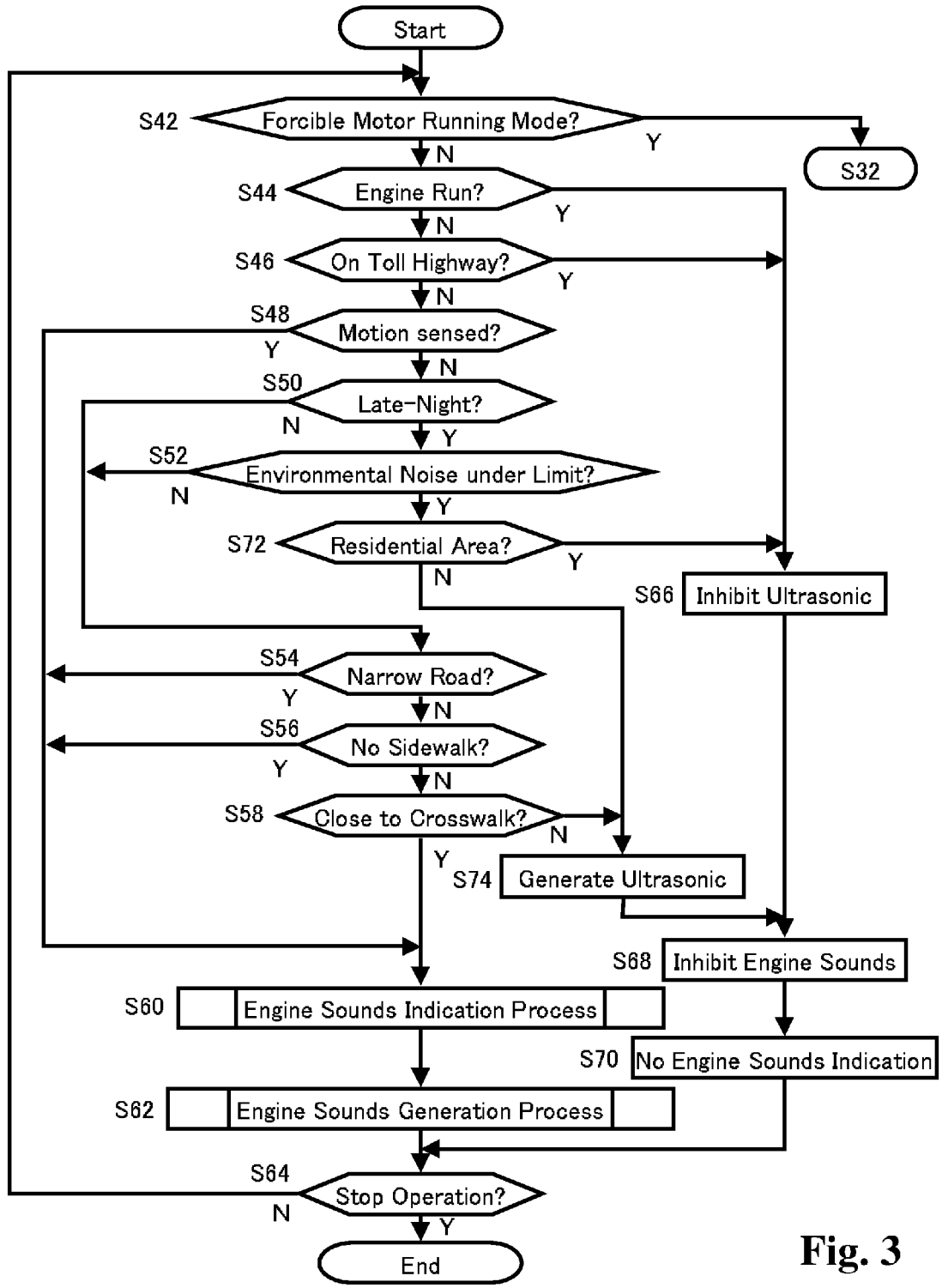
FIG. 3 is a flowchart showing the detailed function of the engine sounds generation process during run in step S22 in FIG. 2.

FIG. 3 is a flowchart showing the detailed function of the engine sounds generation process during run in step S22 in FIG. 2. If the flowchart starts, it is checked in step S42 whether or not the forcible motor running mode is set. If the forcible motor running mode setting is detected in step S42, the flow goes to step S32 in FIG. 2. Thus, the change in setting to the forcible motor running mode is possible during run. On the other hand, if it is not detected in step S42 that the forcible motor running mode is set, the flow goes to step S44 to check whether or not vehicle 2 is running by gasoline engine. If not, the flow goes to step S46 to check whether or not vehicle 2 is running on toll highway. If not, the flow further goes to step S48 to check whether or not motion sensor 64 detects any pedestrian. If not, the flow further goes to step S50 to check on clock 16 whether or not it is in late-night time zone in which silence is required, e.g., 22:00 to 5:00. If in late-night time zone, the flow goes from step S50 to S52 to check on outside microphone 44 whether or not environmental noise is less than a limit considered to be silence.

If it is determined in step S50 that it is not in late-night time zone, the flow advances to step S54. Further, if it is determined in step S52 that environmental noise is greater than the limit, the flow advances to step S54. The steps led by step S54 are for deciding whether or not to generate the simulated engine sounds on a probability of existence of pedestrians. Initially in step S54, it is checked whether or not vehicle 2 is on a narrow road without center divider for example in accordance with the information form vehicle navigation system unit 20. If not, the flow goes to step S56 to check whether or not vehicle 2 is running on a road without sidewalk also in accordance with the information form vehicle navigation system unit 20. If not, the flow further goes to step S58 to check whether or not vehicle 2 is approaching a crosswalk in accordance with information from vehicle navigation system unit 20 or short-range wireless communicator 24, or combination of those information. If it is determined in step S58 that vehicle 2 is approaching a crosswalk, the flow goes to step S60 to carry out engine sounds indication process, which is similar to the process in step S16 in FIG. 2.

On the other hand, if it is determined in step S48 that motion sensor 64 detects any pedestrian, the flow directly goes to step S60. Further, if it is determined in step S54 that vehicle 2 is on a narrow road, the flow directly goes to step S60. Still further, if it is determined in step S56 that vehicle 2 is running on a road without sidewalk, the flow directly goes to step S60. Following step S60, engine sound generation process is carried out in step S62, which is similar to the process in step S18 in FIG. 2, the flow then going to step S64.

If it is determined in step S44 that vehicle 2 is running by gasoline engine, the flow goes to step 66 to inhibit the ultrasonic sound for informing guide dog of the approach of vehicle 2. The flow further goes to step 68 to inhibit the simulated engine sounds. Further in step S70, the driver is informed by an indication within vehicle 2 of the fact that no simulated engine sound is generated outside vehicle 2, the flow then going to step S64. Thus, the ultrasonic sound and the simulated engine sounds are inhibited when vehicle 2 is running by real gasoline engine 30 since they are redundant in the condition that real engine sounds are generated. However, such a modification is possible that the ultrasonic sound and the simulated engine sounds are not inhibited but are added to real engine sounds with volume higher that that of the real engine sound in the condition that the environmental noise is greater than a limit, or weather is foul, or a pedestrian puts up an umbrella, or the like where high noise possibly drowning out the real engine sounds are expected. The generation of the ultrasonic sound and the simulated engine sounds with high volume in the above conditions can be possible in the similar manner in the flow in FIG. 5 explained later.

Similarly, if it is determined in step S46 that vehicle 2 is running on toll highway, the flow goes to the steps led by step 66 to inhibit the ultrasonic sound and the simulated engine sounds with the driver within vehicle 2 informed of the inhibition, the flow then going to step S64. Thus, the ultrasonic sound and the simulated engine sounds are inhibited when vehicle 2 is running on toll highway where no pedestrian is expected. The inhibition is reasonable in toll highway in that the simulated engine sounds may otherwise be meaninglessly and rather harmfully generated upon traffic jam in toll high way since gasoline engine 30 will be automatically switched into the silent electric motor 32 when the speed of vehicle 2 is lowered due to the traffic jam.

If the late-night is determined in step S50 and the low environmental noise is successively determined in step S52, The flow goes to step S72 to determine whether or not vehicle 2 is in the residential are in response to the information form vehicle navigation system unit 20. If it is determined in step S72 that vehicle 2 is running in residential area, the flow goes to step 66 to inhibit generation of ultrasonic sound prior to going to step S68. This is because that many pet dogs are expected to belong to residential area homes whereas it may be very rare that a pedestrian with a guide dog is in the street at late-night. So, it is reasonable to inhibit the ultrasonic sound in residential area at late-night not to irritate the pet dogs to tongue with meaningless ultrasonic sound. Next in step S68, the generation of simulated engine sounds is inhibited with the driver within vehicle 2 informed of the inhibition in step S70, the flow then going to step S64. This is because that the simulated engine sounds may merely destroy the advantage of hybrid vehicle 2 capable of silent run with electric motor 32 in spite of the low possibility of pedestrian in the late-night residential area street. Even if any pedestrian in the street, he or she is expected to notice the approach of vehicle 2 with its tire noise or the like in the silence of residential area at late-night.

On the other hand, if residential is not determined in step S72, the flow goes to step S74 to generate the ultrasonic sound prior to going to step S68 since it is less probable that a pet dog belongs to a non-residential area than that a pedestrian with a guide dog is in the street. Thus, even in such a case that the simulated engine sounds are inhibited with silent late-night environment taken into consideration, the generation under permissible condition of ultrasonic sound audible for dogs and harmless to human ears is advantageous to avoid an accident at crosswalk between a motor running silent vehicle and a pedestrian with a guide dog.

In step S64, it is checked whether or not an operation to stop vehicle 2 is made by brake 1. If such an operation is detected in step S64, the flow goes to the end to advance to step S24 in FIG. 2. On the other hand, if such an operation is not detected in step S64, the flow goes back to step S42 to repeat steps S42 to S74 unless the stop operation is detected in step S64.

Figure 4:
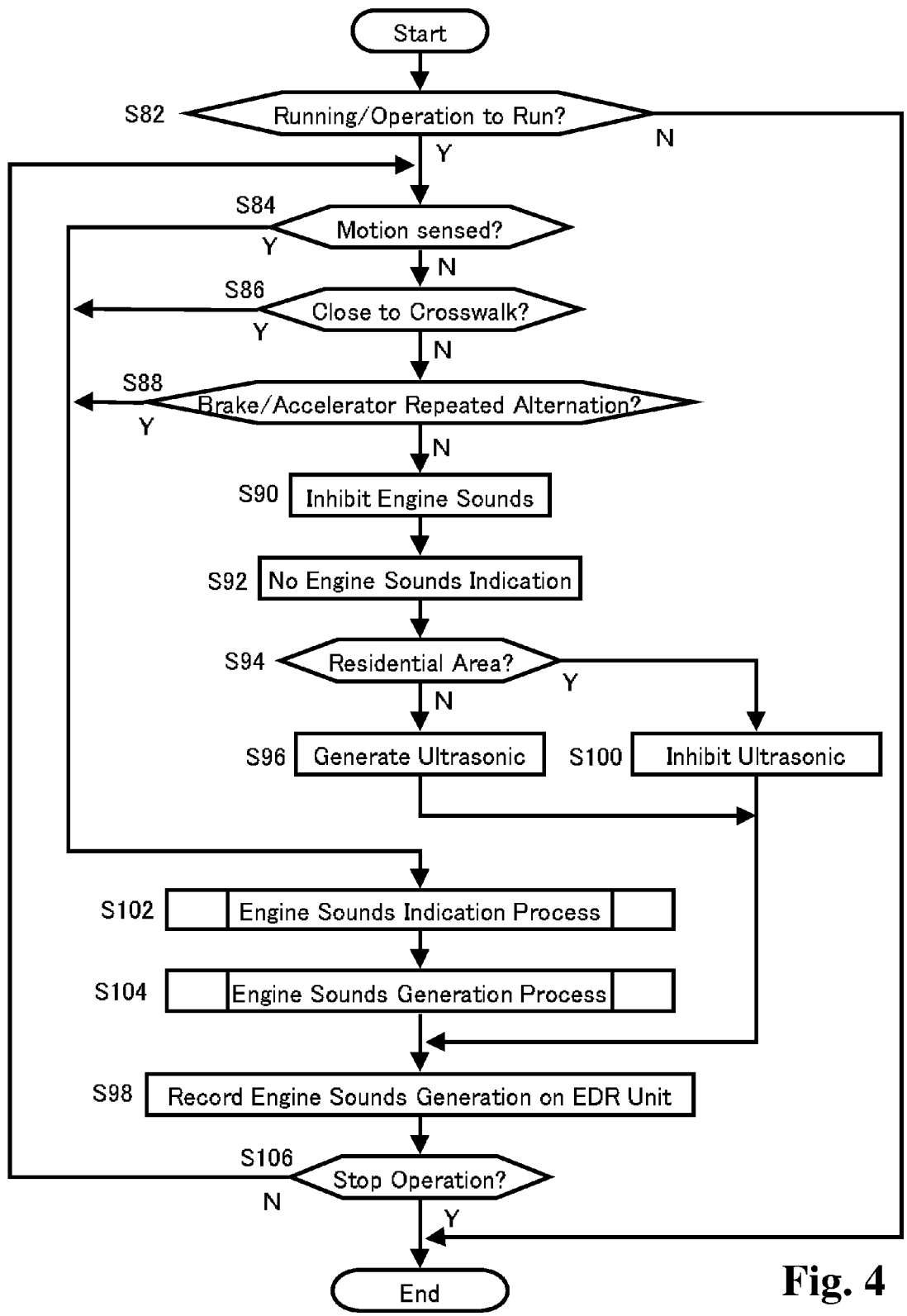
FIG. 4 is a flowchart showing the detailed function of the motor run process in step S36 in FIG. 2.

FIG. 4 is a flowchart showing the detailed function of the motor run process in step S36 in FIG. 2, in which motor run is forcibly carried out from start up till stopping of vehicle 2. If the flowchart starts, it is checked in step S82 whether or not vehicle 2 is in one of the running condition or a condition with the operation to run having been done. If vehicle 2 is not in any of these conditions, the flow instantly goes to the send to advance to step S26 in FIG. 2.

On the other hand, if it is determined in step S82 that vehicle 2 is in one of the running condition or a condition with the operation to run having been done, the flow goes to step S84 to check whether or not motion sensor 64 detects any pedestrian exists in the vicinity of vehicle 2. If not, the flow goes to step S86 to check whether or not vehicle 2 is approaching a crosswalk in accordance with information from vehicle navigation system unit 20 or short-range wireless communicator 24, or combination of those information. If not, the flow goes to step S88 to check whether or not frequent repetitions of alternating operations of brake 1 and accelerator 3 are made. Such alternating operations are typically experienced at a crawl in a narrow road filled by pedestrians. If not, the flow goes to step S90.

The above steps S84 to S88 are for determining whether or not vehicle 2 is in one of the conditions to exceptionally generate the simulated engine sounds in spite of the forcible motor running mode set with an intention to achieve a silent run. If vehicle 2 is not any of such conditions, the flow goes to step S90 to inhibit the simulated engine sounds generation. Further, in step S92, the driver is informed by an indication within vehicle 2 of the fact that no simulated engine sound is generated outside vehicle 2, the flow then going to step S94.

In step S94, it is checked, whether or not vehicle 2 is in the residential are in response to the information form vehicle navigation system unit 20. If not, the flow goes to step S94 to generate ultrasonic sound prior to going to step S98. On the other hand, if the residential area is determined in step S94, the flow goes to step S100 to inhibit generation of ultrasonic sound prior to going to step S98. The meaning of the above steps S94, S96 and S100 is similar to that of steps S72, S74 and S66. In other words, even in such a case that the simulated engine sounds are inhibited in accordance with the forcible motor running mode setting, the generation under permissible condition of ultrasonic sound is advantageous to avoid an accident at crosswalk between a motor running vehicle and a pedestrian with a guide dog.

In step S98, it is directed to record on EDR unit 68 the fact whether or not the simulated engine sounds and ultrasonic sound are generated as well as various events which have occurred during the run of vehicle 2. Accordingly, such a condition is to be recorded on EDR 68 that vehicle 2 is running in the forcible electric running mode in which the simulated engine sound is inhibited. Such a record may constitute a circumstantial evidence if an accident will unfortunately occur due to an injured person unable to notice a silent approach of vehicle 2. Thus, as has been previously mentioned, a driver who sets the forcible electric running mode becomes more careful in driving under such setting.

On the other hand, if pedestrian detection by motion sensor 64 is determined in step S84, or if an approach of vehicle 2 to a crosswalk is determined in step S86, or if the frequent repetitions of alternating brake 1 and accelerator operations are determined in step S88, the flow goes to step S102 in every case. In step S102, engine sounds indication process similar to step S60 in FIG. 3 is carried out. Further, in step S104, engine sounds generation process similar to step S62 in FIG. 3 is carried out. The flow then goes to step S98, in which it is directed to record on EDR unit 68 the fact of generating the simulated engine sounds in those case.

Upon completion of the direction of EDR unit recording, the flow goes to step S106 to check whether or not an operation to stop vehicle 2 is made by brake 1. If such an operation is not detected in step S106, the flow goes back to step S84 to repeat steps S84 to S106 unless the stop operation is detected in step S106. On the other hand, the stop operation is detected in step S106, the flow goes to the end to advance to step S26 in FIG. 2.

According to the embodiment above, it should be noted that the detection in one of steps S84 to S88 prevents the driver from optionally inhibiting generation of the simulated engine sounds even by setting the forcible motor running mode to basically seek silent running. In other words, in such a case that the existence of a pedestrian in the vicinity of vehicle 2 or the approach of vehicle 2 to a crosswalk is detected, generation of the simulated engine sounds is superior to the silent run by electric motor 32 for the purpose of keep safety of pedestrians. Further, it should be also noted that the automatic change from inhibition to generation of the simulated engine sounds in response to the detection in step S88 of the repeated alternation of operations of brake 1 and accelerator 3 is advantageous for pedestrians to easily notice and get off vehicle 2 and also advantageous for vehicle 2 to smoothly go ahead in a narrow street filled by pedestrians. The various features disclosed in the flow of FIG. 4 are not only applicable to hybrid vehicles, but also to electric vehicles having no gasoline engine.

Figure 5:
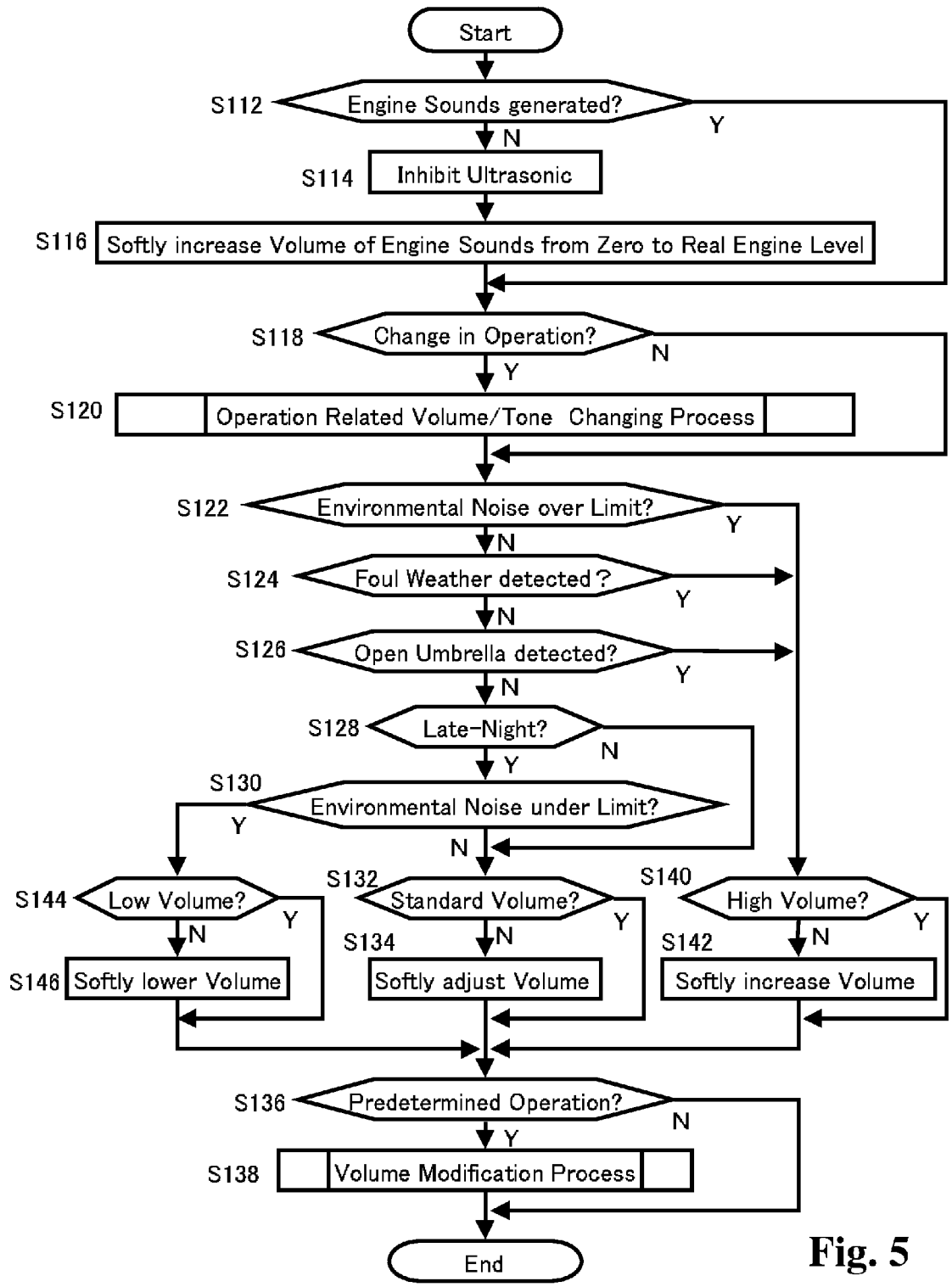
FIG. 5 is a flowchart showing the detailed function of the simulated engine sounds generation process in steps S18 and S22 in FIG. 2, step S62 and step S104 in FIG. 4.

FIG. 5 is a flowchart showing the detailed function of the simulated engine sounds generation process in steps S18 and S22 in FIG. 2, step S62 and step S104 in FIG. 4. If the flowchart starts, it is checked in step S112 whether or not the simulated engine sounds are generated. If not, the flow goes to steps led by step S114 for newly starting generation of the simulated engine sounds. Firstly in step S114, the ultrasonic sound for guide dog is inhibited. This is for such a case that the flow of FIG. 5 results by way of step S74 in FIG. 3 or step S96 in FIG. 4, through which the ultrasonic sound has started to be generated. Of course, if ultrasonic is not generated, nothing functions in step S114.

Next in step S116, the simulated engine sounds start to be generated in such a manner that the volume of them softly increased from zero to the level of real engine sound. This is for copying the start of real engine sound not to astonish people in the vicinity of vehicle 2 with sudden and artificial emergence of the simulated engine sounds. The desired natural rise of the simulated engine sounds is controlled by the volume changing pattern data 50 of sound memory 46 in FIG. 1. Or, alternatively, the volume of the initial rise can be controller by a more simplified pattern. Step 118 follows the initial rise of the simulated engine sounds controlled by step S116. On the other hand, if it is determined in step S112 that the simulated engine sounds have been already generated, the flow directly goes to step S118.

In step S118, it checked whether or not any change in operation made. If any change is detected in step S118, the flow goes to step S120 to carry out the operation related volume or tone changing process, in which engine sound data 48 is modified in volume or tone by referring to a table in sound memory 46 showing the relationship between the volume changing pattern 50 and the related operation at operating portion 6, the flow then advancing to step S122. On the other hand, if no change is detected in step S118, the flow directly goes to step S122.

In step S122, it is checked whether or not the environmental noise picked up by outside microphone 44 is over a predetermined limit, which is so determined that pedestrians in the vicinity of vehicle 2 hardly notice the approach of vehicle 2 unless the volume is increased to a level greater than that of real engine sound. If it is determined in step S122 that the environmental noise is less that the limit, the flow goes to step S124 to check whether the weather is foul by means of weather sensor 66 detecting rain drops or low barometric pressure in which high environmental noise by rain or wind is presumed. If a foul weather is not detected in step S124, the flow goes to step S126 to check whether or not an existence of a pedestrian putting up umbrella exists in the vicinity of vehicle 2 by means of processing image captured by camera unit 70. If no pedestrian with open umbrella is detected in step S126, the flow goes to step S128.

In step S128, the date of clock 16 is utilized to check whether or not it is in late-night time zone. If it is in late-night, the flow goes to step S130 to check whether or not the environmental noise picked up by outside microphone 44 is under a predetermined limit, which is of a so quiet level that the real engine sounds is considered to be harmful. If not, the flow goes to step S132. In this case, the simulated engine sounds of a standard volume which is comparable to that of the real gasoline engine will not harm the acoustic environment. Thus, it is checked in step S132 whether or not the current simulated engine sounds is of the standard volume. If not, the flow goes to step S134 to softly adjust the volume from the high or low volume to the standard volume prior to going to step S136. On the other hand, if it is determined in step S132 that the current simulated engine sounds is of the standard volume, the flow directly goes to step S136.

On the contrary, if it is determined in step S122 that the environmental noise is over the limit, the flow goes to step S140 to check whether or not the current simulated engine sounds is of the high volume. If not, the flow goes to step S142 to softly increase the volume from the standard or low volume to the high volume prior to going to step S136, the high volume being greater that that of the real gasoline engine sounds. On the other hand, if it is determined in step S140 that the current simulated engine sounds is of the high volume, the flow directly goes to step S136. Further, if the foul whether is detected in step S124 or a pedestrian with open umbrella is detected in step S126, the flow goes to step S140 to carry out the similar control to attain the high volume.

On the other hand, if it is determined in step S130 that the environmental noise at late-night is under the limit, the flow goes to step S144 to check whether or not the current simulated engine sounds is of the low volume. If not, the flow goes to step S146 to softly lower the volume from the standard or high volume to the low volume prior to going to step S136, the low volume being less that that of the real gasoline engine sounds. On the other hand, if it is determined in step S144 that the current simulated engine sounds is of the low volume, the flow directly goes to step S136. The limit for step S130 is higher than the limit for step S52 in FIG. 3. In other words, the simulated engine sounds are generated in permissibly low volume with environmental noise under the limit for step S130 in contrast to that the simulated engine sounds are not generated at all with environmental noise under the limit for step S52. This means the limit for step S130 is of a level in which such environmental noise exists as to drown out tire noise. Thus, the simulated engine sounds in the lower volume is necessary under the limit for step S130 for pedestrians to hear vehicle 2 approaching them.

In step S136, it is checked whether or not a predetermined operation is done, such as one of an operation of select lever 7 for reverse travel, an operation of blinker lever 9 and an alternating operations of brake 1 and accelerator 3. If one of such predetermined operations is detected in step 136, the flow goes to step S138 for carrying out the volume modification process, in which volume of the simulated engine sounds are modified to copy the change in volume of the real gasoline engine peculiar to the predetermined operation, the flow then going to the end. On the other hand, if none of the predetermined operations is detected in step S136, the flow directly goes to the end. The detail of volume modification process in step S138 is explained later. In FIG. 5, the volume is changed among discrete three levels, such as low, standard and high volumes. Alternatively, however, the number of the levels may be increased to achieve more sensitive control, or the volume may be continuously changed.

Figure 6:
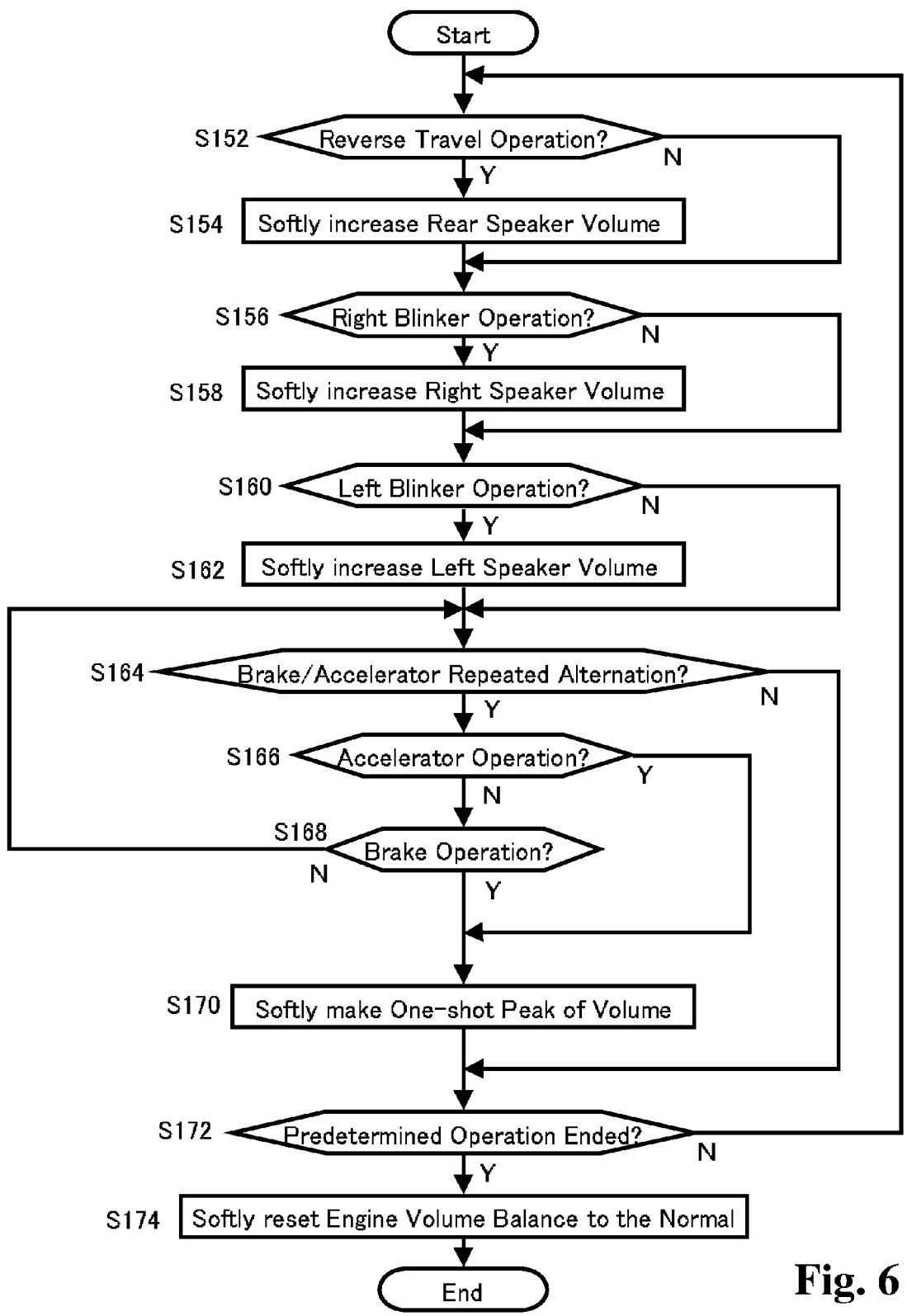
FIG. 6 is a flowchart showing the detailed function of the volume modification process in steps S138 in FIG. 5.

FIG. 6 is a flowchart showing the detailed function of the volume modification process in steps S138 in FIG. 5. If the flowchart starts, it is checked in step S152 whether or not an operation of select lever 7 for reverse travel. If the reverse travel operation is detected in step S152, the flow goes to step S154 to softly increase the volume of rear speaker unit 58 relative to that of front speaker unit 56 to change the volume balance between the two speakers. This is for effectively notifying pedestrians behind vehicle 2 of the rear travel thereof. In the case of the forward travel, on the contrary, the volume valance is so set that the volume of front speaker unit 56 is greater that that rear speaker unit 58. In other words, the volume of rear speaker unit 58 is lowered or muted in the case of the forward travel. The flow then goes form step S154 to step S156. On the other hand, if the select lever operation for reverse travel is not detected in step S152, the flow directly goes step S156.

In step S156, it is checked whether or not an operation of blinker lever 9 for right turn. If such a right blinker operation is detected in step S156, the flow goes to step S158 to softly increase the volume of right speaker unit 60 relative to that of left speaker unit 62 to change the volume balance between the two speakers. This is for effectively notifying pedestrians on the right side of vehicle 2 of the right turn thereof. In the case of the straight travel, on the contrary, the volume valance is so set that the volume of right speaker unit 60 is equal to that that left speaker unit 62. Or alternatively, both the right speaker unit 60 and left speaker unit 62 are muted in the case of straight travel. The flow then goes form step S158 to step S160. On the other hand, if the blinker lever operation for right turn is not detected in step S156, the flow directly goes step S160.

In step S160, it is checked whether or not an operation of blinker lever 9 for left turn. If such a left blinker operation is detected in step S160, the flow goes to step S162 to softly increase the volume of left speaker unit 62 relative to that of right speaker unit 60 to change the volume balance between the two speakers. Similarly to the case of right turn, this is for effectively notifying pedestrians on the left side of vehicle 2 of the left turn thereof, the flow then going to step S164. On the other hand, if the blinker lever operation for left turn is not detected in step S160, the flow directly goes step S164. The functions of changing the volume balance between speaker units carried out in steps S156 to S162 are useful not only for the purpose of right or left turn, but also for the purpose of selectively notifying pedestrians on the right-front or left-front of vehicle 2 of the approach thereof in the case of the straight travel. In such a case, the balance change may be caused by a special switch independent from blinker lever 9 for the purpose of avoiding confusion.

In step S164, it is checked whether or not frequent repetitions of alternating operations of brake 1 and accelerator 3 are made. The check in step S164 is achieved by firstly detecting the successive operations of brake 1 and accelerator 3 made within a short period and by secondly confirming that it is within a time frame from the last detected operation. In other words, if a time has past over the time frame with no further detection of the operation of brake 1 and accelerator 3, step S164 determines that the brake/accelerator repeated alternation has terminated. If it is determined in step S164 that frequent repetitions of alternating operations of brake 1 and accelerator 3 are now being made, the flow goes to step S166 to check whether an operation of accelerator 3 is newly made within the time frame started from the last detection. If not, the flow goes to step S168 to check whether an operation of brake 1 is newly made within the time frame started from the last detection. If not, the flow goes back to step S164 to check again whether or not the time frame has past. Thus, steps S164 to S168 are repeated unless a new operation of brake 1 or accelerator 3 is detected within the time frame for waiting for the new operation made.

If an operation of accelerator 3 is detected in step S166 or an operation of brake 1 is detected in S168, the flow goes to step S170 in any of the case for making a one-shot peak of volume by softy increasing and then decreasing the volume once a detection of the operation of brake 1 or accelerator 3 Step S170 may be modified not to make a one-shot peak but to make a plurality of softly repeating peaks for one detection of the operation of brake 1 or accelerator 3. The flow then goes from step S170 to step S172. On the other hand, if no frequent repetitions of alternating operations of brake 1 and accelerator 3 is detected in step S164 at all or it is determined in step S164 that no new operation is detected within the time frame from the last detection, the flow directly goes to step S172.

In step S172, it is checked whether or not the predetermined operation causing the flow of FIG. 6 is ended. In other words, it is checked in step S172 whether or not the operation of select lever 7 for reverse travel or the operation of blinker lever 9 is ended. Further, it is checked in step S172 whether or not the time frame is over with no new operation detected since the last detection. If it is not detected in step S172 that the predetermined operation is ended in accordance with the above manner, the flow goes back to step S152 to repeat steps S152 to S172 unless the end of the predetermined operation is detected. By means of the repetition, the volume of the simulated sounds change in accordance with natural and soft wave pattern in response to frequent repetitions between operations of brake 1 and accelerator 3. On the other hand, if it is detected in step S172 that the predetermined operation is ended, the flow goes to step S174 to softly reset engine volume balance to the normal condition for straight forward travel, the flow then going to the end.

Figure 7:
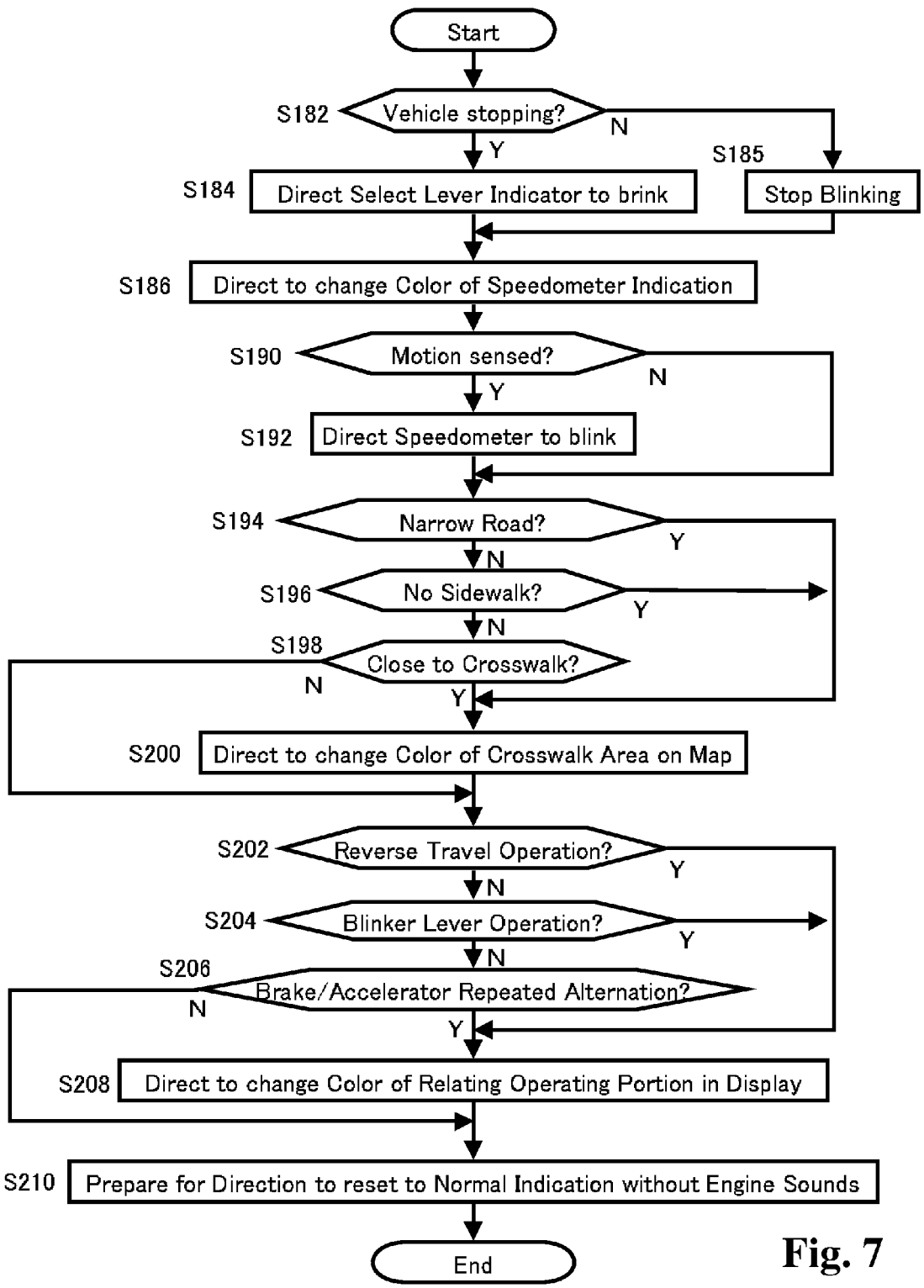
FIG. 7 is a flowchart showing the detailed function of the simulated engine sounds indication process in steps S16 in FIG. 2, S60 in FIG. 3 and S102 in FIG. 4.

FIG. 7 is a flowchart showing the detailed function of the simulated engine sounds indication process in steps S16 in FIG. 2, S60 in FIG. 3 and S102 in FIG. 4. If the flowchart starts, it is checked in step S182 whether or not vehicle 2 is stopping. If vehicle 2 is stopping, the flow goes to step 184 to direct select lever indicator 40 to blink. Select lever indicator 40 is for indicating one of select lever positions, "P", "R", "N", "D", and "L", on which the driver is assumed to have his or her eyes for starting to drive vehicle 2. By means of the blinking of select lever indicator 40, accordingly, the driver is naturally informed of the fact that the simulated engine sounds are generated outside vehicle 2. The flow then goes from step S184 to step S186. On the other hand, if it is determined in step S182 that vehicle 2 is not stopping, but running, the flow goes to step S185 to stop the rather bothersome blink of select lever indicator 40, the flow then going to step S186. Step S185 is for functioning in the moment of starting vehicle 2 to cancel the blink once initiated in step S184 which functions only when vehicle 2 is stopping. In other words, step S185 has no function if the flowchart of FIG. 7 is started during vehicle 2 has already being running without blinking of select lever 40.

In step S186, it is directed to change the color for indication of speedometer 42, such as the color of indicating needle or indicating digit. For example, the color of speedometer indication is basically changed between gasoline engine running and electric motor running. Further, the color of speedometer indication upon electric motor running with the simulated engine sounds is set to the same color as that of gasoline engine running. Thus, in the case of running with engine sounds, the color of speedometer indication is the same, such as in orange color, regardless of whether the sounds outside vehicle 2 are caused by the real gasoline engine or by the simulated engines sounds generator. On the contrary, in the case of silent running without engine sounds, the color of speedometer indication is changed into a clearly different one, such as green color. In the case of the above example, it is directed in step S186 to change the color for indication of speedometer 42 from green to orange.

In step S190 it is checked whether or not motion sensor 64 detects any pedestrian. If any pedestrian is detected, the flow goes to step S192 to direct speedometer indication to blink. In the case that a pedestrian exists in the vicinity of vehicle 2, it is important for both the driver and the pedestrian to communicate with each other by means of well sharing the fact that the simulated engine sounds are generated outside vehicle 2. The blink of speedometer indication is an effective help for the driver to become aware of the simulated engine sounds generation for avoiding such an inconsistency that the driver gets a false idea of no generation of the simulated engine sounds though the pedestrian actually hears the simulated engine sounds. The flow then goes from step S192 to step S194. On the other hand, if no pedestrian is detected in step S190, the flow directly goes to step S194.

In step S194 it is checked whether or not vehicle 2 is on a narrow road. If not, the flow goes to step S196 to check whether or not vehicle 2 is running on a road without sidewalk. If not, the flow further goes to step S198 to check whether or not vehicle 2 is approaching a crosswalk. If the approach to a crosswalk is detected in step S198, the flow goes to step S200, in which it is generally directed to change a partial color of the indication of the detected special area on map 22 controlled by vehicle navigation system 20, the flow then going to step S202. In the case of the detection in step S198, the change in color is caused at crosswalk area on map 22. Similarly, if it is determined in step S194 that vehicle 2 is on a narrow road, or it is determined in step S196 that vehicle 2 is running on a road without sidewalk, the flow goes to step S200 to direct the change in color of indication for the detected corresponding area on map 22. Thus, if the generation of simulated engine sounds is caused by a run in a special area, the indication of the generation of simulated engine sounds is made on map 22 controlled by vehicle navigation system 20. On the other hand, if no approach to a crosswalk is detected in step S198, which means that a run in a special area is not detected in any of steps S198 to S198, the flow goes t step S202 with no indication for the generation of the simulated engine sounds caused.

In step S202, it is checked whether or not an operation of select lever 7 for reverse travel. If not, the flow goes to step S204 to check whether or not an operation of blinker lever 9. If not, the flow further goes to step S206 to check whether or not frequent repetitions of alternating operations of brake 1 and accelerator 3 are made. If the frequent repetitions of alternating operations are detected, the flow goes to step S208, in which it is generally directed to change color of relating operating portion indication, the flow then going to step S210. In the case of the detection in step S206, the change in color is caused with respect to indication of brake 1. Similarly, if the operation of select lever 7 for reverse travel is detected in step S202, or an operation of blinker lever 9 is detected in step S204, the flow goes to step S208 to direct the change in color of indication for the detected corresponding operation. In other words, the color of indicating select lever position, "R" is changed in the former case, while the color of blinker indication is changed in the later case. Thus, if the generation of simulated engine sounds is caused in relation with an operation of vehicle 2, the indication of the generation of simulated engine sounds is made at the indicating portion originally prepared for indicating the related operation. On the other hand, if no frequent repetition of alternating operations of brake 1 and accelerator 3 is detected in step S206, which means that no related operation is detected in any of steps S202 to S206, the flow goes t step S210 with no indication for the generation of the simulated engine sounds caused.

In step S210, it is directed to prepare for a direction to reset the indication to a normal condition with no simulated engine sounds generated, the flow then going to the end. Step S210 is necessary for resetting the indication to the normal condition in response to the direction to be made in step S30 in FIG. 2, or step S70 in FIG. 3, or step S92 in FIG. 4. Namely, various indication changes caused o inform the driver of the generation of the simulated engine sounds are each cancelled to return to the normal indicating condition in synchronism with the termination of the simulated engine sounds in response to one of the above mentioned directions.

The above mentioned various features according to this invention are not only applicable to the disclosed embodiment, but to any other embodiment which seeks warm and safe coexistence of both vehicles and pedestrians in various situations with the advantage of hybrid vehicles or electric vehicles capable of silent run maintained as much as possible.

What is claimed is:
1. A vehicle capable of low noise runs comprising:
   an electric motor for driving the vehicle having advantage of silent run;

a sound generator arranged to generate simulated engine sounds outside the vehicle for pedestrians to hear the vehicle;

a controller arranged to switch the sound generator between a first condition not to generate the simulated engine sounds and a second condition to generate the simulated engine sounds;

a vehicle function unit arranged to have the controller automatically switch the sound generator from the second condition to the first condition to prefer the advantage of silent run by the electric motor to a meaningless and rather harmful generation of the simulated engine sounds; and a manually setting unit, wherein the controller is arranged to normally switch the sound generator between the first condition and the second condition in response to the manually setting unit and to automatically switch the sound generator from the second condition to the first condition in response to the vehicle function unit regardless of the manually setting unit.

2. The vehicle according to claim 1, wherein the vehicle function unit includes a vehicle navigation system unit, wherein the vehicle navigation system unit is arranged to have the controller automatically switch the sound generator from the second condition to the first condition in response to the vehicle navigation system unit detecting that the vehicle runs on highway where pedestrians may not exist in a high probability.

3. The vehicle according to claim 1, wherein the vehicle function unit includes an electronic toll system unit, wherein the electronic toll system unit is arranged to have the controller automatically switch the sound generator from the second condition to the first condition in response to the electronic toll system unit detecting that the vehicle goes into highway where pedestrians may not exist in a high probability.

4. The vehicle according to claim 1, wherein the vehicle function unit includes an event data recorder unit, wherein the event data recorder unit is arranged to record whether the vehicle runs in the first condition or the second condition in accordance with the switching by the controller.

5. The vehicle according to claim 4 further comprising a manually setting unit, wherein the controller is arranged to switch the sound generator between the first condition and the second condition in response to the manually setting unit, and wherein the event data recorder unit is arranged to record whether the vehicle runs in the first condition or the second condition in accordance with the manually setting unit.

6. The vehicle according to claim 1, wherein the vehicle function unit is arranged to have the controller automatically switch the sound generator from the second condition to the first condition if the vehicle runs on highway where pedestrians may not exist in a high probability.

7. The vehicle according to claim 1, wherein the vehicle function unit includes a clock, and wherein the clock is arranged to have the controller automatically switch the sound generator from the second condition to the first condition in response to the clock detecting that the vehicle runs in a time zone when pedestrians may not exist in a high probability or environmental noise is less than a limit in a high possibility.

8. The vehicle according to claim 7, wherein the time zone is a late time zone when it is empty or quiet.

9. The vehicle according to claim 1, wherein the vehicle function unit includes a microphone, and wherein the microphone is arranged to have the controller automatically switch the sound generator from the second condition to the first condition in response to the microphone detecting that environmental noise is less than a limit in which pedestrians if any may notice approach of the vehicle without the simulated engine sounds in a high possibility.

10. The vehicle according to claim 1, wherein the vehicle function unit includes a vehicle navigation system unit, wherein the vehicle navigation system unit is arranged to have the controller automatically switch the sound generator from the second condition to the first condition in response to the vehicle navigation system unit detecting that the vehicle runs in residential area in which pedestrians if any may notice approach of the vehicle without the simulated engine sounds in a high possibility.

11. The vehicle according to claim 10, wherein the vehicle function unit includes a clock, wherein the clock is arranged to detect a late time zone when pedestrians if any in the residential area may notice the approach of the vehicle without the simulated engine sounds in a high possibility.

12. The vehicle according to claim 10, wherein the vehicle function unit includes a microphone wherein the microphone is arranged to detect that environmental noise is less than a limit in which pedestrians if any in the residential area may notice the approach of the vehicle without the simulated engine sounds in a high possibility.

13. A vehicle capable of low noise runs comprising:

an electric motor for driving the vehicle;

a sound generator arranged to generate simulated engine sounds outside the vehicle for pedestrians to hear the vehicle;

a controller arranged to switch the sound generator between a first condition not to generate the simulated engine sounds and a second condition to generate the simulated engine sounds;

a manually setting unit arranged to have the controller switch the sound generator between the first condition and the second condition in response to the manually setting unit, and an event data recorder unit arranged to record whether the vehicle runs in the first condition or the second condition in accordance with the manually setting unit.

14. The vehicle according to claim 13, wherein the event data recorder unit is arranged to record the setting of the manually setting unit.

15. The vehicle according to claim 13, wherein the controller is arranged to normally switch the sound generator between the first condition and the second condition in response to the manually setting unit and to automatically switch the sound generator from the first condition to the second condition under a predetermined condition regardless of the manually setting unit.

16. The vehicle according to claim 15 further comprising a decider arranged to decide that pedestrians may exist as the predetermined condition, wherein the controller is arranged to automatically switch the sound generator from the first condition to the second condition in response to the decider regardless of the manually setting unit.

17. The vehicle according to claim 13, wherein the electric motor has advantage of silent run, and wherein the vehicle further comprises a vehicle function unit arranged to have the controller automatically switch the sound generator from the second condition to the first condition to prefer the advantage of silent run by the electric motor to a meaningless and rather harmful generation of the simulated engine sounds, wherein the event recorder is arranged to record whether the vehicle runs in the first condition or the second condition in accordance with the switching by the controller.

18. A vehicle capable of low noise runs comprising:

an electric motor for driving the vehicle;

a sound generator arranged to generate simulated engine sounds outside the vehicle for pedestrians to hear the vehicle;

a controller arranged to switch the sound generator between a first condition not to generate the simulated engine sounds and a second condition to generate the simulated engine sounds; and a manually setting unit arranged to have the controller switch the sound generator between the first condition and the second condition in response to the manually setting unit, wherein the controller is arranged to normally switch the sound generator between the first condition and the second condition in response to the manually setting unit and to automatically switch the sound generator from the first condition to the second condition under a predetermined condition regardless of the manually setting unit.

19. The vehicle according to claim 18 further comprising a decider arranged to decide that pedestrians may exist as the predetermined condition, wherein the controller is arranged to automatically switch the sound generator from the first condition to the second condition in response to the decider regardless of the manually setting unit.

20. The vehicle according to claim 18, wherein the electric motor has advantage of silent run, and wherein the vehicle further comprises a vehicle function unit arranged to have the controller automatically switch the sound generator from the second condition to the first condition to prefer the advantage of silent run by the electric motor to a meaningless and rather harmful generation of the simulated engine sounds.

* * * * *